July 16, 1963  E. LEVY, JR., ET AL  3,098,192

PROTECTIVE CIRCUIT FOR DIRECT CURRENT VOLTAGE REGULATORS

Filed Feb. 6, 1961

ERNEST LEVY, JR.
RUSSELL D. LOUCKS, II.
INVENTORS

BY
AGENT

United States Patent Office

3,098,192
Patented July 16, 1963

3,098,192
PROTECTIVE CIRCUIT FOR DIRECT CURRENT
VOLTAGE REGULATORS
Ernest Levy, Jr., Norwalk, and Russell D. Loucks II, Ridgefield, Conn., assignors, by mesne assignments, to Raytheon Company, Lexington, Mass., a corporation of Delaware
Filed Feb. 6, 1961, Ser. No. 87,137
7 Claims. (Cl. 323—22)

This invention relates to a protective circuit for use with a voltage regulator where the load is positioned at a considerable distance from the regulating circuit and is connected to the regulator circuit by two sets of supply conductors. One set of conductors supplies the current to the load and the other set of conductors is connected across the load at one end and to a sensing circuit at the voltage regulator end. The protective circuit herein described is arranged for the protection of the load and for protecting other components when either one of the sensing conductors is broken or disconnected.

Under ideal circumstances, the voltage regulator for any load is positioned near the load and connected to the load by a single pair of short conductors. In this arrangement, the conductors which supply current to the load also act as conductors for the sensing circuit. However, if the load is located a considerable distance from the regulated source of supply and if the lead conductors have appreciable resistance, it is much better to supply the load with two pairs of conductors, one pair for carrying the load current, which may be considerable, and the other pair for merely sensing the voltage across the load and transmitting its voltage back to the voltage regulator sensing circuit. Under these circumstances the only current carried by the sensing conductors is the current necessary to operate the sensing circuit and this may be a very small current. While such a dual circuit has many advantages, a break in the sensing leads will generally cause the voltage regulator circuit to generate its highest possible voltage and thereby damage the load.

The present invention uses the double lead arrangement but connects a diode rectifier between similar terminals in the sensing and supply circuits. If a sensing conductor is broken, the sensing circuit is still connected to the load by means of a rectifier which has a drop of about one volt, and for this reason, the voltage across the load will rise only one volt above the desired regulated value. If both sensing leads are broken, the voltage will be only two volts greater than the desired load voltage.

The invention comprises a direct current voltage regulator supply circuit having a first pair of output terminals for connection to a load (load terminals). A second pair of output terminals (sensing circuit terminals) is supplied for connecting sensing conductors to the load for determining an error voltage. The sensing conductors are connected, via the sensing circuit terminals, to a sensing circuit which includes a voltage reference component and a pair of output terminals for transferring an error voltage to an amplifier circuit and a variable passing impedance. A rectifier component is connected between each of the pairs of output terminals so that the sensing circuit will still receive a voltage similar to the load voltage when either one or both of the sensing conductors are broken. The voltage regulator circuit may be connected to a direct current source or may be coupled to an alternating current source of supply in series with the usual rectifier means.

One of the objects of this invention is to provide an improved protective circuit for voltage regulator circuits which avoids one or more of the disadvantages and limitations of prior art circuits.

Another object of the invention is to increase the efficiency of voltage regulator circuits by providing adequate sensing and protective devices for regulating voltages at a considerable distance from the regulating circuit.

Another object of the invention is to reduce the output voltage of a voltage regulator circuit when one or both of the sensing conductors is broken.

The invention includes a direct current voltage regulator circuit having a passing impedance connected in series with one of the supply conductors, a set of output terminals for connecting to conductors which are connected with a load at a considerable distance. The regulating circuit also includes output terminals for connection to sensing conductors which are connected across the load but carry only the value of voltage existing across the load. The usual sensing circuit includes a voltage reference and output terminals which transfer an error voltage to an amplifier. The amplifier output is connected to the passing impedance which regulates the output voltage.

For a better understanding of the present invention, together with other and further objects thereof, reference is made to the following description taken in connection with the accompanying drawings.

Figure 1:
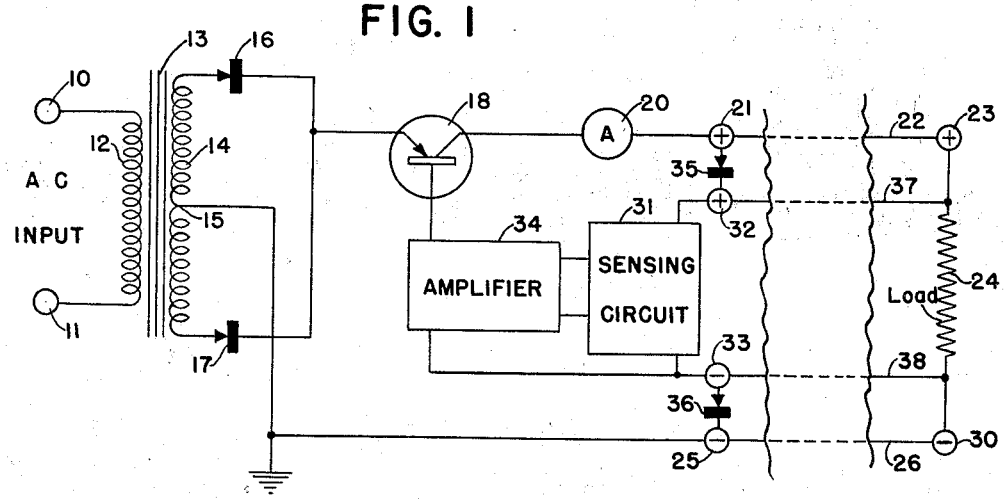
FIG. 1 is a schematic diagram of connections showing the voltage regulator and load with the two pairs of load conductors.

Referring now to FIG. 1, the regulator circuit includes a pair of input terminals 10 and 11 which are to be connected to an alternating current source of supply. The input terminals are connected to a primary winding 12 on a transformer core 13 which also holds a secondary winding 14 having a mid-point tap 15 and having its ends connected to rectifiers 16 and 17. The two rectifiers are connected together and to a passing impedance 18 which may be the emitter and collector electrodes of a transistor as shown in the drawing. The collector of the transistor is connected through an amplifier 20 to an output terminal 21 which is connected to a positive load conductor 22 extending for a considerable distance where it is connected by a terminal 23 to load 24.

The mid-point 15 of secondary winding 14 is connected to ground and to a negative terminal 25 to which a second conductor 26 is connected to transfer the regulated current to the negative load terminal 30.

The sensing circuit 31 contains a voltage reference and has input terminals 32 and 33. The output of the sensing circuit 31 is connected to an amplifier 34 whose output is connected to the base of the passing transistor 18 for controlling its resistance. Terminals 21 and 32 are connected by a rectifier 35 and terminals 33 and 25 are connected by a similar rectifier 36, these rectifiers acting only in the case that the conductors 37 or 38 leading from terminals 32 and 33 to the load are broken.

The operation of this circuit is as follows: Under normal circumstances the alternating current supply is rectified and the positive currents are connected through transistor 18 which may be controlled to vary considerably in resistance. The load 24 has its positive terminal connected to terminal 21 of the regulator circuit by conductor 22 which carries the load current. In a similar manner conductor 26 carries the load current between the negative regulator terminal 25 and the negative load terminal 30. As the load varies, the current through conductors 22 and 26 varies considerably and the voltage drop between the regulator terminals and the load terminals varies in a like manner due to the conductor resistance. In order to eliminate this voltage drop, a second set of conductors 37 and 38 are provided which connect from the load terminals to the sensing circuit and do not carry any of the load current. This arrangement of dual conductors works well for any distance but is especially effective when the load and the voltage regulator are separated by conductors which have a resistance sufficient to provide a voltage drop less than the drop across either one of the diodes 35 or 36. When this condition exists, current flows from terminal 21, over conductor 22 to terminal 23, back over conductor 37 to terminal 32 and the sensing circuit. A similar circuit exists on the negative side of the supply circuit and current flows through conductors 26 and 38 before reaching the sensing circuit. If the voltage drop around these loops is greater than the voltage drop across diodes 35 and 36 the current would then flow directly from terminal 21 to terminal 32 and also from terminal 25 to terminal 33 and therefore not provide an accurate sampling of the load voltage.

If one of the conductors 37 or 38 is broken, or if they become disconnected at either end, the current will then flow through the diodes 35 and 36 and show a load voltage which is either one or two volts greater than the desired load voltage. If the diodes are not in the circuit as shown, a break in either one or both of conductors 37 and 38 will show a zero voltage across the load and therefore cause the sensing circuit and the amplifier 34 to reduce the passing impedance 18 to its lowest value and apply a high voltage across the load terminals which may damage the load 24 or other components in the sensing and amplifier circuits. With the diodes 35 and 36 connected in the circuit as shown, the load voltage cannot rise more than two volts above the desired value.

In some applications where conductors 22 and 26 are quite long, the voltage drop around loops 22 and 37 and 38 and 26 may be greater than the voltage drops across single diodes. In this case two or more diodes may be substituted for the single diodes 35 and 36 shown in FIG. 1. No matter how many diode rectifiers are connected between terminals 21, 32 or terminals 25, 33 the increase in voltage due to a conductor break will be the difference between the voltage drop around the conductor loop 22—37 and the drop across the rectifier units.

Figure 2:
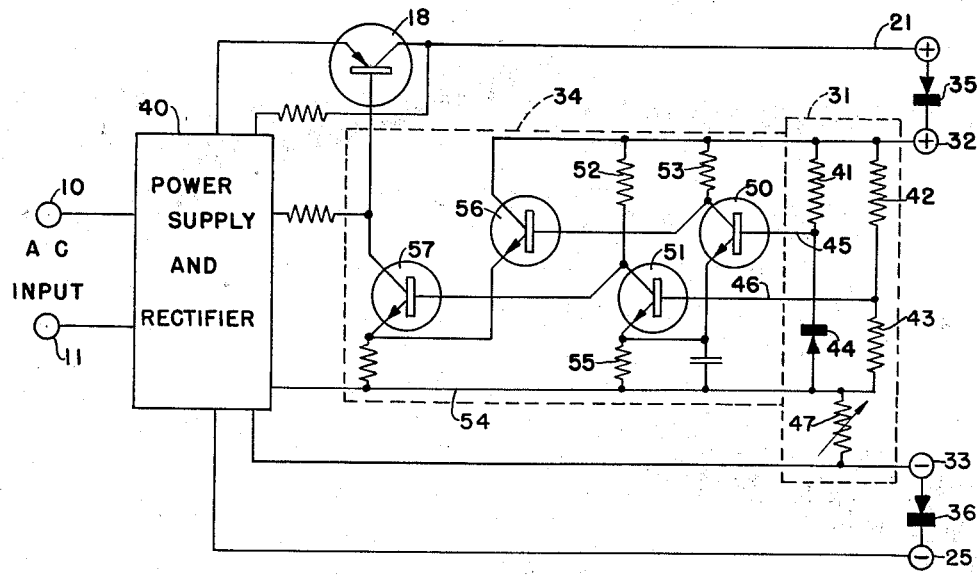
FIG. 2 is a schematic diagram of connections showing one form of sensing circuit which may be used with the circuit shown in FIG. 1.

FIG. 2 shows parts of the same circuit with details of one of the sensing circuits which may be used with this type of regulator and details of an amplifier 34 for coupling the output of the sensing circuit to the base of the passing transistor.

The sensing circuit is similar to prior art arrangements and comprises a four-armed Wheatstone bridge having three resistors 41, 42, and 43 as three of the arms. The fourth arm is a zener diode 44 and forms the voltage reference. The error voltage is transferred on conductors 45 and 46 to the amplifier circuit 34. A variable resistor 47 is connected in series between the bottom of the bridge and the negative terminal 33 to adjust the desired load voltage. A variable transformer may be substituted for transformer 13 and the adjustable arms of each mechanically coupled together to increase the voltage range.

The amplifier 34 may have a number of forms. One circuit which has given good results includes two input transistors 50 and 51 with their bases connected to bridge output conductors 45 and 46. Transistors 50 and 51 are NPN units and have their collectors connected to positive terminal 32 in series with resistors 52 and 53. The emitters are connected together and to a negative common conductor 54 through a resistor 55. The collector electrodes of transistors 50 and 51 are connected respectively to the bases of transistors 56 and 57 which have a common emitter supply through resistor 58. The collector of transistor 57 is the output of the amplifier and is connected to the base of the passing transistor 18 to control the load voltage. While this type of amplifier circuit has given good results it will be obvious that many other types of amplifier circuits could be used instead.

From the above description it will be evident that the invention provides a safe circuit arrangement for sensing a load voltage at a distance.

The foregoing disclosure and drawings are merely illustrative of the principles of this invention and are not to be interpreted in a limiting sense. The only limitations are to be determined from the scope of the appended claims.

We claim:

1. A protective circuit for direct current voltage regulators comprising; a voltage regulator circuit connected to a power source which may vary in voltage, load terminals for connection to a direct current load having a voltage lying within a restricted range of values, a controlled passing impedance in series between the power source and a load terminal, and a sensing circuit having an error voltage as the output thereof indicating whether the actual load voltage is above or below a desired load voltage; a pair of sensing circuit terminals for connection to a pair of conductors which are connected across the load for determining the load voltage and for applying the load voltage as an input to the sensing circuit; the output of the sensing circuit connected to the passing impedance to control the passing impedance in accordance with the error voltage to thereby stabilize the output voltage; and a pair of diode rectifiers each respectively connected between one of the load terminals and one of the sensing terminals.

2. A protective circuit for direct current voltage regulators comprising; a voltage regulator circuit connected to a direct current power source which may vary in applied voltage, positive and negative load terminals for connection to a direct current load to supply a voltage within a restricted range of values, a passing impedance coupled between said source and one of the load terminals for stabilizing the load voltage, and a sensing circuit having an error voltage as the output thereof indicating whether the actual load voltage is above or below a desired load voltage; positive and negative sensing circuit terminals connected to the sensing circuit and for connection to the load in series with a pair of conductors for determining the voltage across the load; a first diode rectifier connected between the positive load terminal and the positive sensing terminal; and a second diode rectifier connected between the negative load terminal and the negative sensing terminal.

3. A protective circuit as set forth in claim 2 wherein the load terminals and the sensing circuit terminals are connected to the load by means of extended conductors.

4. A protective circuit as set forth in claim 3 wherein said load conductors carry all the load current.

5. A protective circuit as set forth in claim 3 wherein the voltage drop through said conductors connecting the load terminals and the sensing terminals is less than the voltage drop across said connected diodes.

6. A protective circuit as set forth in claim 3 wherein during the normal operation of the circuit all the sensing current flows through the conductors connecting the sensing terminals and the load.

7. A protective circuit as set forth in claim 3 wherein the anode of the first diode is connected to the positive load terminal and the cathode of the second diode is connected to the negative load terminal.

References Cited in the file of this patent

UNITED STATES PATENTS 2,925,548    Scherer _____ Feb. 16, 1960